United States Patent
Zumbaugh et al.

(10) Patent No.: US 8,146,569 B2
(45) Date of Patent: Apr. 3, 2012

(54) CONTROL SYSTEMS AND METHODS FOR NEWLY ASSEMBLED ENGINES

(75) Inventors: Michael C. Zumbaugh, Troy, MI (US); Jon C. Miller, Fenton, MI (US); Robert C. Gibson, Canton, MI (US); Mark D. Carr, Fenton, MI (US); Michael J. Lucido, Northville, MI (US); Michael N. Kotsonas, Highland, MI (US)

(73) Assignee: GM Global Technology Operations LLC

( * ) Notice: Subject to any disclaimer, the term of this patent is extended or adjusted under 35 U.S.C. 154(b) by 451 days.

(21) Appl. No.: 12/505,150

(22) Filed: Jul. 17, 2009

(65) Prior Publication Data

US 2010/0288231 A1  Nov. 18, 2010

Related U.S. Application Data

(60) Provisional application No. 61/177,378, filed on May 12, 2009.

(51) Int. Cl.
*F02M 51/00* (2006.01)

(52) U.S. Cl. ........ 123/491; 701/113; 701/101; 701/103; 701/104; 701/105; 123/406.12; 123/179.16

(58) Field of Classification Search ............... 123/179.3, 123/179.4, 457, 458, 179.16, 179.17, 179.18, 123/491; 701/101–106, 113, 115
See application file for complete search history.

(56) References Cited

U.S. PATENT DOCUMENTS

| 4,442,813 | A  | * | 4/1984  | Nagase et al. ........... 123/406.53 |
| 4,836,157 | A  | * | 6/1989  | Miller ....................... 123/179.11 |
| 5,095,880 | A  | * | 3/1992  | Ricks ............................ 123/516 |
| 5,237,975 | A  | * | 8/1993  | Betki et al. ..................... 123/497 |
| 5,927,253 | A  | * | 7/1999  | Oyafuso et al. ............... 123/456 |
| 6,701,905 | B1 | * | 3/2004  | Gaskins ........................ 123/674 |
| 6,874,482 | B2 | * | 4/2005  | Lahner et al. ................ 123/516 |
| 7,210,441 | B1 | * | 5/2007  | Burns ....................... 123/179.11 |
| 7,900,606 | B2 | * | 3/2011  | Lucido et al. ................ 123/516 |
| 8,042,520 | B2 | * | 10/2011 | Miller et al. .................. 123/458 |
| 2010/0288231 | A1 | * | 11/2010 | Zumbaugh et al. ...... 123/406.12 |
| 2010/0307460 | A1 | * | 12/2010 | Matsuki et al. ............... 123/511 |

FOREIGN PATENT DOCUMENTS

| EP | 2239450 A1 | * | 10/2010 |
| JP | 200444553 A | * | 2/2004 |

* cited by examiner

*Primary Examiner* — Stephen K Cronin
*Assistant Examiner* — Raza Najmuddin

(57) ABSTRACT

An engine control system for a vehicle comprises a combustion control module and an engine startup module. The combustion control module selectively controls a spark timing and airflow into an engine based on a counter value. The engine startup module, when the counter value is one of greater than and less than a predetermined final value, controls an equivalence ratio (EQR) of an air/fuel mixture provided to the engine during an engine cranking period based on a fuel rail pressure and controls the EQR during an engine running period based on the fuel rail pressure and an engine runtime period. The counter value is set to the predetermined final value after the engine is started for a first time after the engine is assembled.

20 Claims, 3 Drawing Sheets

CONTROL SYSTEMS AND METHODS FOR NEWLY ASSEMBLED ENGINES

CROSS-REFERENCE TO RELATED APPLICATIONS

This application claims the benefit of U.S. Provisional Application No. 61/177,378, filed on May 12, 2009. The disclosure of the above application is incorporated herein by reference in its entirety.

FIELD

The present disclosure relates to internal combustion engines and more particularly to engine control system and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine of a vehicle combusts a mixture of air and fuel to produce drive torque. The air is drawn into the engine through a throttle valve and an intake manifold. Fuel is mixed with the air to form an air/fuel mixture. The air/fuel mixture is combusted within one or more cylinders of the engine.

The fuel that is combusted by the engine is stored in a fuel tank. A low pressure pump draws fuel from the fuel tank. The low pressure pump pressurizes the fuel and supplies low pressure fuel to a high pressure pump. The high pressure pump further pressurizes the fuel and supplies the pressurized fuel to one or more fuel injectors.

An engine control module (ECM) controls the amount and timing of fuel injection, torque output by the engine, and other parameters. The ECM may also diagnose faults in one or more components of the vehicle. These faults may be used to, for example, notify a driver to seek service and aid a service technician in servicing the vehicle.

SUMMARY

An engine control system for a vehicle comprises a combustion control module and an engine startup module. The combustion control module selectively controls a spark timing and airflow into an engine based on a counter value. The engine startup module, when the counter value is one of greater than and less than a predetermined final value, controls an equivalence ratio (EQR) of an air/fuel mixture provided to the engine during an engine cranking period based on a fuel rail pressure and controls the EQR during an engine running period based on the fuel rail pressure and an engine runtime period. The counter value is set to the predetermined final value after the engine is started for a first time after the engine is assembled.

In other features, the engine startup module decreases the EQR as the fuel rail pressure increases during the engine cranking period.

In still other features, the engine startup module decreases the EQR as the fuel rail pressure increases during the engine running period.

In further features, the engine startup module decreases the EQR as the engine runtime period increases.

In still further features, the engine control system further comprises a catalyst diagnostic module. The catalyst diagnostic module selectively commands adjustment of the EQR for performance of a catalyst diagnostic. The engine startup module disables the catalyst diagnostic module when the counter value is the one of greater than and less than the predetermined final value.

In other features, the engine control system further comprises a catalyst lightoff module. The catalyst lightoff module selectively commands injection of fuel into a cylinder of the engine in two or more separate fuel injections during a combustion cycle to warm a catalyst to a predetermined lightoff temperature. The engine startup module disables the catalyst lightoff module when the counter value is the one of greater than and less than the predetermined final value.

In still other features, the engine control system further comprises a rail pressure module. The rail pressure module selectively controls the fuel rail pressure based on a predetermined startup pressure. The engine startup module adjusts the fuel rail pressure to a predetermined purging pressure that is greater than the predetermined startup pressure when the counter value is the one of greater than and less than the predetermined final value.

In further features, the rail pressure module decreases the fuel rail pressure to the predetermined startup pressure after the fuel rail pressure reaches the predetermined purging pressure.

In still further features, the engine startup module controls the EQR based on the fuel rail pressure and the engine runtime period during the engine running period until the engine runtime period exceeds a predetermined period.

In other features, the combustion control module maintains the spark timing and the airflow while the counter value is the one of greater than and less than the predetermined final value.

An engine control method for a vehicle comprises: selectively controlling a spark timing and airflow into an engine based on a counter value; and, when the counter value is one of greater than and less than a predetermined final value, controlling an equivalence ratio (EQR) of an air/fuel mixture provided to the engine during an engine cranking period based on a fuel rail pressure and controlling the EQR during an engine running period based on the fuel rail pressure and an engine runtime period. The counter value is set to the predetermined final value after the engine is started for a first time after the engine is assembled.

In other features, the engine control method further comprises decreasing the EQR as the fuel rail pressure increases during the engine cranking period.

In still other features, the engine control method further comprises decreasing the EQR as the fuel rail pressure increases during the engine running period.

In further features, the engine control method further comprises decreasing the EQR as the engine runtime period increases.

In still further features, the engine control method further comprises selectively commanding adjustment of the EQR for performance of a catalyst diagnostic and disabling the commanding when the counter value is the one of greater than and less than the predetermined final value.

In other features, the engine control method further comprises selectively commanding injection of fuel into a cylinder of the engine in two or more separate fuel injections during a combustion cycle to warm a catalyst to a predetermined lightoff temperature and disabling the commanding when the counter value is the one of greater than and less than the predetermined final value.

In still other features, the engine control method further comprises selectively controlling the fuel rail pressure based on a predetermined startup pressure and adjusting the fuel rail pressure to a predetermined purging pressure that is greater than the predetermined startup pressure when the counter value is the one of greater than and less than the predetermined final value.

In further features, the engine control method further comprises decreasing the fuel rail pressure to the predetermined startup pressure after the fuel rail pressure reaches the predetermined purging pressure.

In still further features, the engine control method further comprises controlling the EQR based on the fuel rail pressure and the engine runtime period during the engine running period until the engine runtime period exceeds a predetermined period.

In other features, the engine control method further comprises maintaining the spark timing and the airflow while the counter value is the one of greater than and less than the predetermined final value.

Further areas of applicability of the present disclosure will become apparent from the detailed description provided hereinafter. It should be understood that the detailed description and specific examples are intended for purposes of illustration only and are not intended to limit the scope of the disclosure.

DETAILED DESCRIPTION

Figure 1:
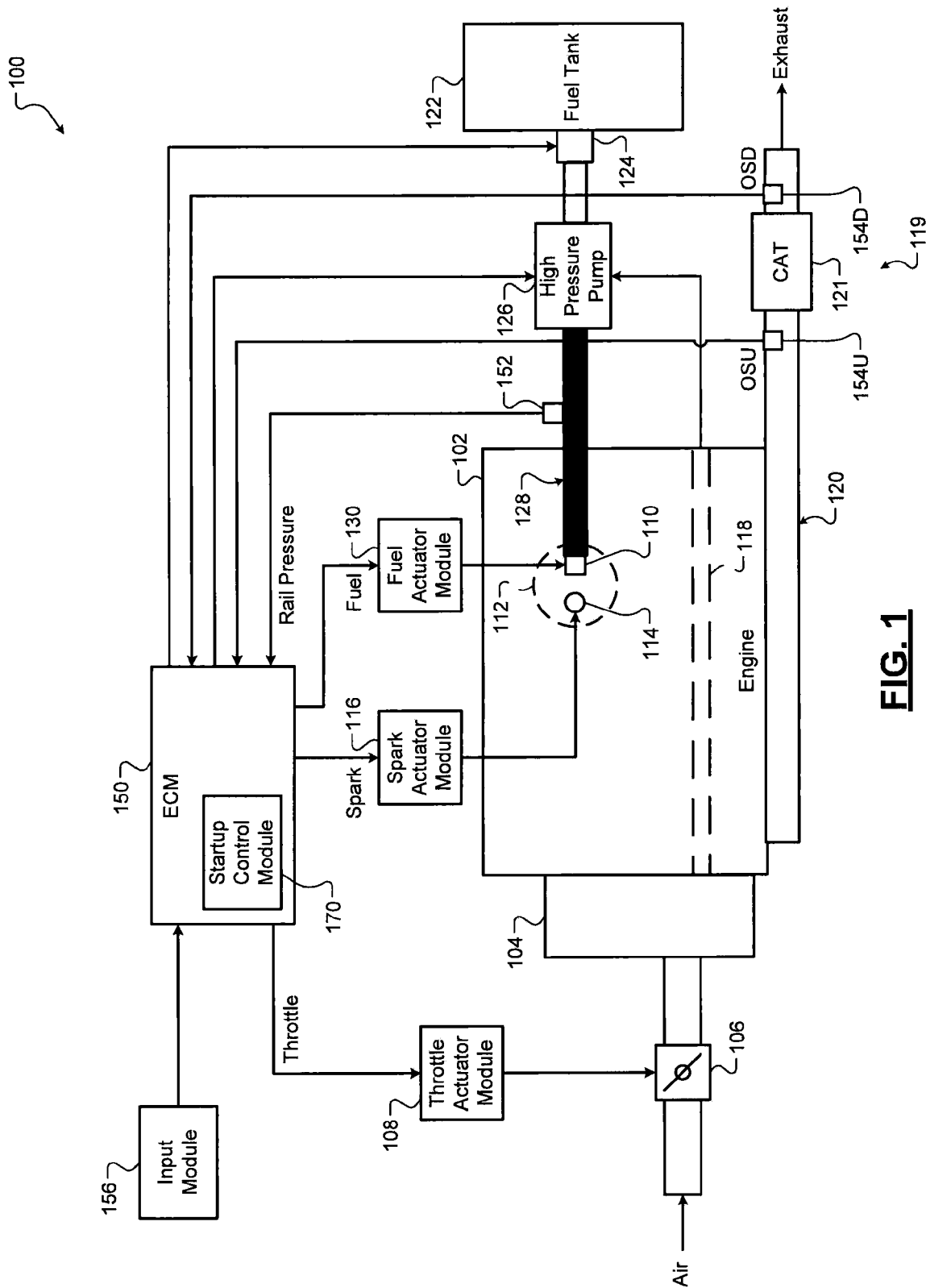
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A fuel system supplies fuel to an engine for combustion. Among other components, the fuel system includes a low pressure fuel pump and a high pressure fuel pump. The low pressure fuel pump supplies fuel at low pressures to the high pressure pump. The high pressure fuel pump may be driven by the engine and further pressurizes the fuel within a fuel rail. A rail pressure sensor measures the pressure of the fuel within the fuel rail (i.e., rail pressure).

An engine cranking procedure is initiated when an engine startup command is received. An engine control module (ECM) activates the low pressure fuel pump before and during engine cranking to increase the rail pressure to a predetermined startup pressure that is suitable for fuel injection. A starter engages and rotates a crankshaft of the engine, thereby driving the high pressure fuel pump. The ECM selectively activates the high pressure fuel pump during engine cranking to increase the rail pressure.

During vehicle assembly, however, air is trapped within the fuel rail. When the engine is started for a first time at an assembly location (e.g., an assembly plant), air trapped within the fuel rail may prevent the ECM from providing a desired air/fuel mixture. More specifically, air trapped within the fuel rail may be purged from the fuel rail and cause the air/fuel mixture to be lean. The lean air/fuel mixture may cause, for example, engine misfire, stalling, and/or setting of one or more codes in diagnostic memory.

The ECM of the present disclosure controls the air/fuel mixture based on the rail pressure during engine cranking when the engine is started for the first time after being assembled. The ECM controls the air/fuel mixture based on the rail pressure and how long the engine has been running (i.e., engine runtime) as the engine runs when the engine is started for the first time after assembly.

Referring now to FIG. 1, a functional block diagram of an engine system 100 is presented. Air is drawn into an engine 102 through an intake manifold 104. A throttle valve 106 is actuated by a throttle actuator module 108 to vary the volume of air drawn into the engine 102. The throttle actuator module 108 may include, for example, an electronic throttle controller (ETC). The air mixes with fuel from one or more fuel injectors 110 to form an air/fuel mixture. The air/fuel mixture is combusted within one or more cylinders of the engine 102, such as cylinder 112.

A spark plug 114 initiates combustion of the air/fuel mixture within the cylinder 112. A spark actuator module 116 controls the spark plug 114. Although one fuel injector, spark plug, and cylinder are shown, the engine 102 may include more or fewer fuel injectors, spark plugs, and cylinders. For example only, the engine 102 may include 2, 3, 4, 5, 6, 8, 10, or 12 cylinders. One fuel injector and spark plug may be provided for each cylinder of the engine 102. Drive torque generated by combustion of the air/fuel mixture is output from the engine 102 via a crankshaft 118.

Exhaust gas resulting from combustion is expelled from the engine 102 to an exhaust system 119. The exhaust gas travels through an exhaust pipe 120 to a catalyst 121. The catalyst 121 reacts with various components of the exhaust gas and reduces the amount of those components in the exhaust gas. For example only, the catalyst 121 may include a three-way catalyst.

Fuel for combustion is stored in a fuel tank 122. A low pressure pump 124 draws fuel from the fuel tank 122 and supplies fuel to a high pressure pump 126. The high pressure pump 126 provides pressurized fuel to the fuel injectors via a fuel rail 128. The high pressure pump 126 may be driven by the engine 102, such as by the crankshaft 118. In other implementations, the high pressure pump 126 may be driven by a camshaft (not shown). In another implementation, the high pressure pump 126 may be independently powered (e.g., electrically).

A fuel actuator module 130 controls opening of the fuel injector 110 based on signals from an engine control module (ECM) 150. In this manner, the ECM 150 controls the timing of fuel injection and the amount of fuel injected by the fuel injector 110. The ECM 150 also controls airflow into the engine 102 via the throttle actuator module 108, spark timing via the spark plug 114, and other engine parameters.

The ECM 150 controls an equivalence ratio (EQR) of the air/fuel mixture combusted within the cylinder 112 by controlling the airflow and the amount of fuel injected. During normal engine operation, the ECM 150 controls the amount of fuel injected to provide an air/fuel mixture having a stoichiometric EQR (e.g., EQR of 1.0).

The EQR of a given air/fuel mixture corresponds to a ratio of the respective masses of fuel and air of the air/fuel mixture in relation to the masses of fuel and air of the stoichiometric air/fuel mixture. For example only, the EQR of a given air/fuel mixture may be determined using the equation:

$$EQR = \frac{(m_{fuel}/M_{O2})}{(m_{fuel}/m_{O2})_{Stoich}},$$

where $m_{fuel}$ is the mass of fuel, $m_{O2}$ is the mass of air, and Stoich is a stoichiometric air/fuel mixture.

The ECM 150 may use signals from various sensors to make control decisions for the engine system 100. A rail pressure sensor 152 measures pressure within the fuel rail 128 and outputs a rail pressure signal accordingly. Oxygen sensors 154U and 154D measure oxygen in the exhaust gas upstream and downstream of the catalyst 121 and output upstream and downstream oxygen signals (OSU and OSD), respectively.

The ECM 150 activates the low pressure pump 124 to increase the rail pressure to a predetermined startup pressure before or when the engine startup command is received. The ECM 150 controls operation (i.e., activation/deactivation) of the high pressure pump 126 to regulate the rail pressure during engine operation. For example only, the ECM 150 may maintain the rail pressure at a predetermined operating pressure during normal engine operation.

Engine startup commands are relayed to the ECM 150 by an input module 156. An engine startup command may be generated based on, for example, turning of a key or depression of a button. A starter (not shown) engages and drives rotation of the crankshaft 118 when an engine startup command is received.

An engine cranking period may be said to begin when the starter begins to drive the crankshaft 118 or when the engine startup command is received. The engine cranking period may extend to when, for example, the engine speed exceeds a predetermined speed (e.g., approximately 500 rpm) for a predetermined number of consecutive combustion events (e.g., four in an engine having four cylinders). When the engine speed exceeds the predetermined speed for the predetermined number of combustion events, an engine running period may be said to begin.

During the engine running period, the ECM 150 selectively adjusts the EQR of the air/fuel mixture combusted within the engine 102 for performance of a catalyst diagnostic. The ECM 150 may also initiate a catalyst warming procedure to warm the catalyst 121 to a predetermined lightoff temperature after engine cranking. For example only, the catalyst warming procedure may include splitting the fuel provided to the cylinder 112 into two or more separate injections, retarding the spark timing, and increasing an idle engine speed. The performance of the catalyst warming procedure may also affect the EQR of the air/fuel mixture.

Air is trapped within the fuel rail 128 during assembly of the engine system 100. When the engine 102 is started for a first time after being assembled (e.g., an assembly plant), the air trapped within the fuel rail 128 during assembly may prevent the ECM 150 from supplying the EQR to the cylinder 112. More specifically, air trapped within the fuel rail 128 may be expelled from the fuel rail 128 into the cylinder 112. The injection of air to the cylinder 112 may cause the air/fuel mixture combusted within the cylinder 112 to be lean (i.e., EQR<1.0). The lean air/fuel mixture may cause, for example, engine misfire, stalling, and/or setting of one or more codes in diagnostic memory (not shown).

The ECM 150 of the present disclosure includes a startup control module 170. The startup control module 170 fixes the spark timing and airflow into the engine 102 when the engine 102 is started for the first time. The startup control module 170 disables the performance of the catalyst diagnostic and the performance of the catalyst warming procedure when the engine 102 is started for the first time.

The startup control module 170 also controls the EQR of the air/fuel mixture provided to the engine 102 when the engine is started for the first time. More specifically, the startup control module 170 controls the EQR based on the rail pressure during the engine cranking period. During the engine running period, the startup control module 170 controls the EQR based on the rail pressure and how long the engine 102 has been running (i.e., engine runtime).

Figure 2:
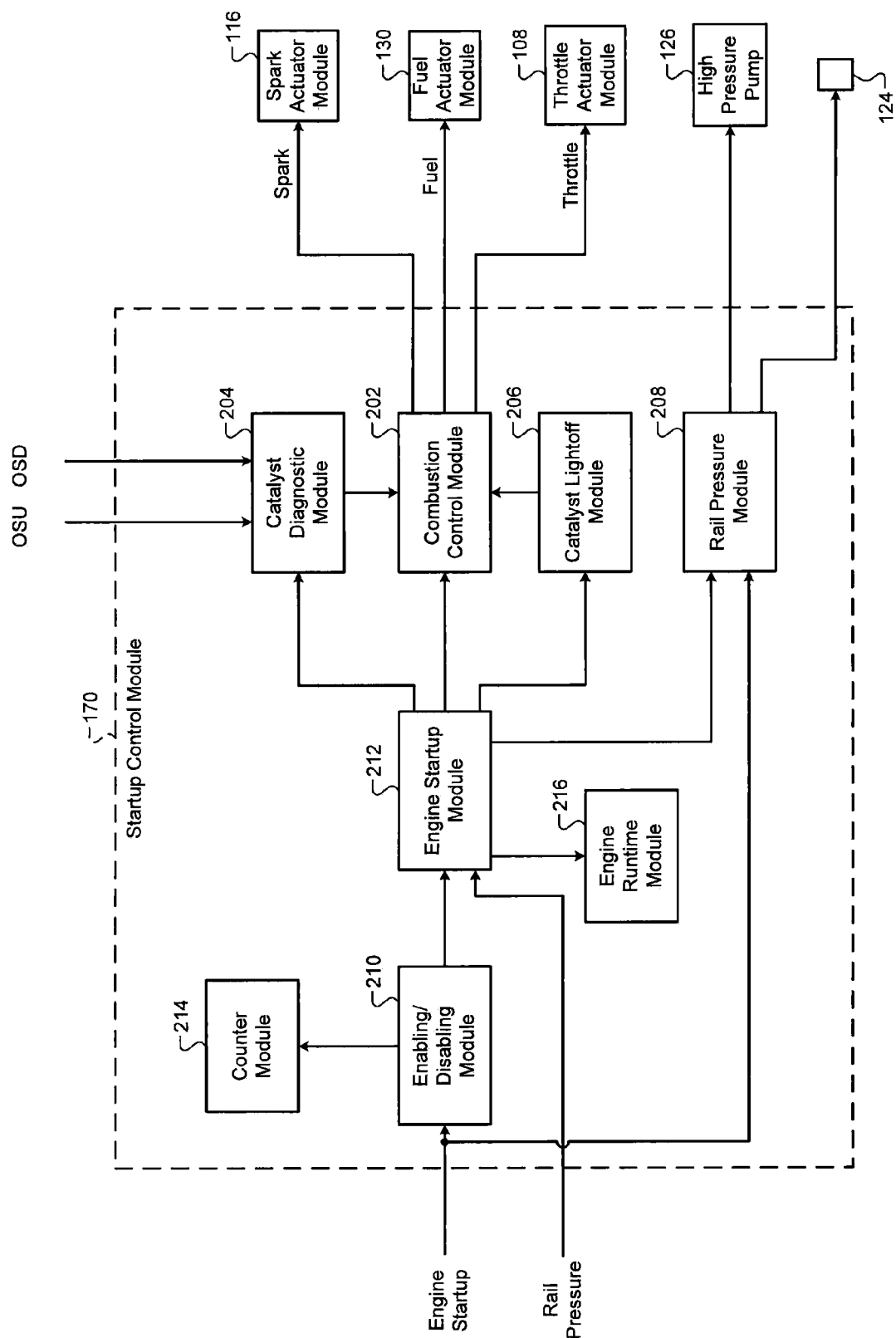
FIG. 2 is a functional block diagram of an exemplary startup control module according to the principles of the present disclosure.

Referring now to FIG. 2, a functional block diagram of an exemplary implementation of the startup control module 170 is presented. The startup control module 170 includes a combustion control module 202, a catalyst diagnostic module 204, a catalyst lightoff module 206, and a rail pressure module 208. The startup control module 170 also includes an enabling/disabling module 210, an engine startup module 212, a counter module 214, and an engine runtime module 216.

The combustion control module 202 controls engine actuators based on various inputs. Each system that varies an engine parameter may be referred to as an actuator. The engine parameter that is varied by an actuator may be referred to as an actuator value.

For example, the throttle actuator module 108 may be referred to as an actuator and the throttle opening area may be referred to as the actuator value. Similarly, the spark actuator module 116 may be referred to as an actuator, while the corresponding actuator value may be the spark timing. The fuel actuator module 130 may also be referred to as an actuator while the amount (e.g., mass) of fuel injected may be the corresponding actuator value. The combustion control module 202 controls the amount of fuel injected to provide a desired EQR for combustion.

One or more vehicle systems may command changes in the EQR of the air/fuel mixture. For example, the catalyst diagnostic module 204 selectively commands changes in the EQR for performance of a catalyst diagnostic. The combustion control module 202 selectively controls the amount of fuel provided to the cylinder 112 based on the EQR commands from the catalyst diagnostic module 204.

In one implementation, the catalyst diagnostic module 204 transitions the EQR from the stoichiometric EQR to a rich EQR (i.e., EQR>stoichiometric EQR), then from the rich EQR to a lean EQR, and from the lean EQR back to the stoichiometric EQR. In another implementation, the catalyst diagnostic module 204 transitions the EQR to the lean EQR, then to the rich EQR, then back to the stoichiometric EQR.

The catalyst diagnostic module 204 transitions the EQR between the rich EQR and the lean EQR to determine the oxygen storage capacity of the catalyst 121 and to determine whether the catalyst 121 is faulty. Faults may be determined based on the oxygen concentration measurements (OSU and OSD) provided by the upstream and downstream oxygen sensors 154U and 154D, respectively.

Other modules or vehicle systems may also command changes in the EQR. For example, the catalyst lightoff module 206 may command changes in the EQR to warm the catalyst 121 to the predetermined lightoff temperature. In various implementations, the catalyst diagnostic module 204 and the catalyst lightoff module 206 may be included within a single module.

The catalyst lightoff module 206 commands provision of fuel to each cylinder of the engine 102 in two or more separate injections. The catalyst lightoff module 206 also retards the spark timing and increases the idle engine speed to warm the catalyst 121. Provision of fuel in separate pulses and/or the retardation of the spark timing provides additional hydrocarbons in the exhaust gas. The hydrocarbons are combusted to warm the catalyst 121 to the predetermined lightoff temperature. The combustion control module 202 selectively controls the provision of fuel based on the commands from the catalyst lightoff module 206.

The rail pressure module 208 controls the rail pressure by controlling the low pressure pump 124 and the high pressure pump 126. The rail pressure module 208 activates the low pressure pump 124 based on the engine startup command. The rail pressure module 208 generally regulates the low pressure pump 124 to achieve a predetermined startup rail pressure when the engine startup command is received. For example only, the predetermined startup rail pressure may be approximately 400-500 kPa.

The enabling/disabling module 210 selectively enables and disables the engine startup module 212. More specifically, the enabling/disabling module 210 enables the engine startup module 212 when the engine 102 is started for the first time. The enabling/disabling module 210 may determine whether to enable or disable the engine startup module 212 based on, for example, a counter value of the counter module 214. The counter value may be implemented in the form of, for example, a manufacturer's enabling counter (MEC).

The counter value is initially set (e.g., by an ECM supplier) to a predetermined initial value. For example only, the counter value may be set to the predetermined initial value of 255. The counter value may be adjusted on one or more occasions after the engine 102 is started for the first time after being assembled. In one implementation, the enabling/disabling module 210 may determine that the engine 102 has previously been started when the counter value different than the predetermined initial value.

The enabling/disabling module 210 may therefore enable the engine startup module 212 when the counter value is equal to the predetermined initial value when the engine startup command is received. Written another way, the enabling/disabling module 210 may disable the engine startup module 212 when the counter value is greater than or less than the predetermined initial value.

The counter value may be set to a predetermined final value after the engine 102 is started for the first time. For example only, the predetermined final value may be zero. In one implementation, the counter value is set to the predetermined final value lastly before the vehicle leaves the assembly location. In such an implementation, the enabling/disabling module may determine that the engine 102 has not previously been started until the counter value is equal to the predetermined final value. Such a determination provides for rail pressure increases even after the engine 102 is started for the first time, such as if the engine 102 stalls during the first running of the engine 102.

The enabling/disabling module 210 may therefore enable the engine startup module 212 when the counter value is greater than or less than the predetermined final value when the engine startup command is received. Written another way, the enabling/disabling module 210 may disable the engine startup module 212 when the counter value is equal to the predetermined final value.

When enabled, the engine startup module 212 disables the catalyst diagnostic module 204 and the catalyst lightoff module 206. In this manner, the engine startup module 212 disables the performance of the catalyst diagnostic and the catalyst warming procedure when the engine 102 is started for the first time. The engine startup module 212 may also disable other modules that could affect the engine startup module's control of the EQR when the engine 102 is started for the first time.

The engine startup module 212 also commands the combustion control module 202 to maintain the spark timing and the throttle opening when the engine startup module 212 is enabled. In this manner, the engine startup module 212 fixes the spark timing and airflow into the engine 102 after the engine 102 is started for the first time. For example only, the engine startup module 212 may set the spark timing and the throttle opening to a predetermined spark timing and a predetermined throttle opening, respectively.

The engine startup module 212 controls the amount of fuel injected while the engine startup module 212 is enabled. In other words, the engine startup module 212 controls the EQR of the air/fuel mixture provided to the engine 102 when the engine 102 is started for the first time. The engine startup module 212 controls the EQR based on the rail pressure during the engine cranking period. For example only, the engine startup module 212 decreases the EQR as the rail pressure increases during the engine cranking period. An increase in the rail pressure may indicate that a lesser amount of air is present in the fuel rail 128.

The engine startup module 212 also controls the EQR of the air/fuel mixture provided to the engine 102 during the engine running period. More specifically, during the engine running period, the engine startup module 212 controls the EQR based on the rail pressure and how long the engine 102 has been running (i.e., engine runtime).

For example only, the engine startup module 212 decreases the EQR during the engine running period as the rail pressure increases or as the engine runtime increases. An increase in the rail pressure may again indicate that a lesser amount of air is present in the fuel rail 128. Further, a lesser amount of air is likely within the fuel rail 128 when the engine 102 has been running for a longer period as there has been more opportunity for trapped air to be purged from the fuel rail 128. The engine runtime module 216 includes an engine runtime timer that tracks the engine runtime period. The engine startup module 212 may control the EQR of the air/fuel mixture provided to the engine 102 based on the rail pressure and the engine runtime period until the engine runtime exceeds a predetermined period.

The engine startup module 212 also selectively increases the rail pressure when the engine startup module 212 is enabled. The engine startup module 212 increases the rail pressure to a predetermined purging pressure. The predetermined purging pressure is greater than the predetermined startup rail pressure and the predetermined operating pressure. For example only, the predetermined purging pressure may be approximately 600 kPa-2 MPa.

The engine startup module 212 provides the predetermined purging pressure to the rail pressure module 208, and the rail pressure module 208 regulates the high pressure pump 126 accordingly. Pressurizing the rail pressure to greater than the predetermined startup pressure decreases the volume of air within the fuel rail 128 (i.e., compresses the air), which provides more accurate control of the EQR during the engine cranking and engine running periods.

Figure 3:
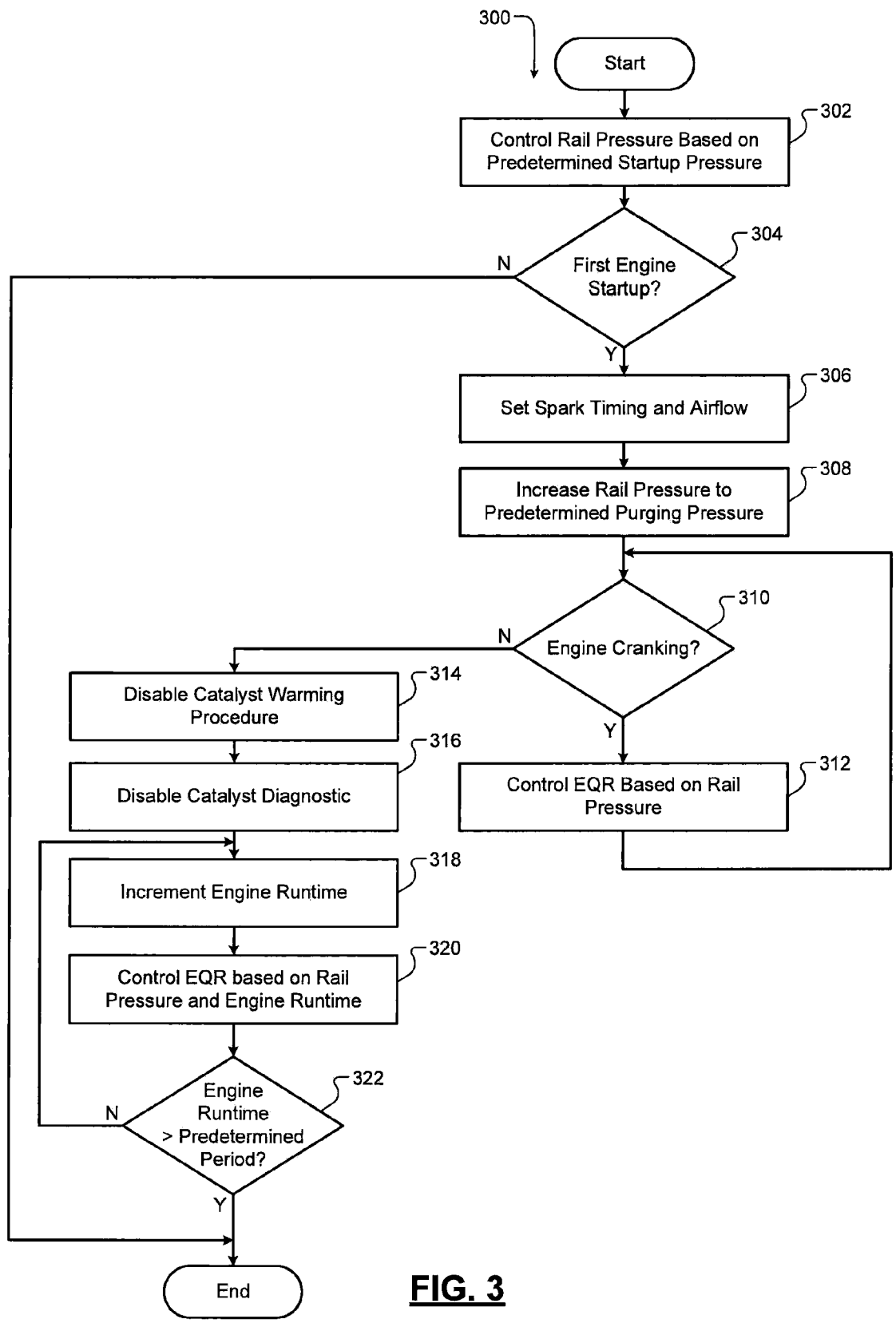
FIG. 3 is a flowchart depicting exemplary steps performed by a method according to the principles of the present disclosure.

Referring now to FIG. 3, a flowchart depicting an exemplary method 300 is presented. The method 300 begins in step 302 where the method 300 controls the rail pressure to the predetermined startup pressure. The method 300 may begin, for example, after the engine startup command is received. The method 300 controls the low pressure pump 124 to regulate the rail pressure to the predetermined startup pressure. The rail pressure may also be controlled using the high pressure pump 126.

The method 300 determines whether this is the first startup of the engine 102 in step 304. If true, the method 300 proceeds to step 306; if false, the method 300 ends. The method 300 may determine whether the engine 102 has previously been started based on, for example, the counter value of the counter module 214.

The method 300 sets the spark timing and the airflow into the engine in step 306 and proceeds to step 308. The method 300 increases the rail pressure to the predetermined purging pressure in step 308 using the high pressure pump 126. The method 300 determines whether engine cranking is occurring in step 310. If true, the method 300 controls the EQR based on the rail pressure in step 312 and returns to step 310. If false, the engine 102 is running, and the method 300 transfers to step 314. The cranking period may be said to end when the engine speed reaches the predetermined speed (e.g., 500 rpm) for the predetermined number of consecutive combustion events (e.g., four in an engine having four cylinders).

In step 314, the method 300 disables the catalyst warming procedure. For example only, the method 300 may disable the provision of fuel in separate injections, disable retardation of the spark timing, and disable the elevation of the idling engine speed scheduled for catalyst warming in step 314. The method 300 disables the catalyst diagnostic in step 316.

The method 300 increments the engine runtime period in step 318 and controls the EQR of the air/fuel mixture supplied to the engine 102 based on the rail pressure and the engine runtime period in step 320. In this manner, the method 300 controls the EQR based on the rail pressure and the engine runtime period during the engine running period. The method 300 determines whether the engine runtime period is greater than the predetermined period in step 322. If true, the method 300 ends; if false, the method 300 returns to step 318.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system for a vehicle, comprising:
   a combustion control module that selectively controls a spark timing and airflow into an engine based on a counter value; and
   a engine startup module that, when said counter value is one of greater than and less than a predetermined final value, controls an equivalence ratio (EQR) of an air/fuel mixture provided to said engine during an engine cranking period based on a fuel rail pressure and controls said EQR during an engine running period based on said fuel rail pressure and an engine runtime period,
   wherein said counter value is set to said predetermined final value after said engine is started for a first time after said engine is assembled.

2. The engine control system of claim 1 wherein said engine startup module decreases said EQR as said fuel rail pressure increases during said engine cranking period.

3. The engine control system of claim 1 wherein said engine startup module decreases said EQR as said fuel rail pressure increases during said engine running period.

4. The engine control system of claim 1 wherein said engine startup module decreases said EQR as said engine runtime period increases.

5. The engine control system of claim 1 further comprising a catalyst diagnostic module that selectively commands adjustment of said EQR for performance of a catalyst diagnostic,
   wherein said engine startup module disables said catalyst diagnostic module when said counter value is said one of greater than and less than said predetermined final value.

6. The engine control system of claim 1 further comprising a catalyst lightoff module that selectively commands injection of fuel into a cylinder of said engine in two or more separate fuel injections during a combustion cycle to warm a catalyst to a predetermined lightoff temperature,
   wherein said engine startup module disables said catalyst lightoff module when said counter value is said one of greater than and less than said predetermined final value.

7. The engine control system of claim 1 further comprising a rail pressure module that selectively controls said fuel rail pressure based on a predetermined startup pressure,
   wherein said engine startup module adjusts said fuel rail pressure to a predetermined purging pressure that is greater than said predetermined startup pressure when said counter value is said one of greater than and less than said predetermined final value.

8. The engine control system of claim 7 wherein said rail pressure module decreases said fuel rail pressure to said predetermined startup pressure after said fuel rail pressure reaches said predetermined purging pressure.

9. The engine control system of claim 7 wherein said engine startup module controls said EQR based on said fuel rail pressure and said engine runtime period during said engine running period until said engine runtime period exceeds a predetermined period.

10. The engine control system of claim 1 wherein said combustion control module maintains said spark timing and said airflow while said counter value is said one of greater than and less than said predetermined final value.

11. An engine control method for a vehicle, comprising:
    selectively controlling a spark timing and airflow into an engine based on a counter value; and
    when said counter value is one of greater than and less than a predetermined final value, controlling an equivalence ratio (EQR) of an air/fuel mixture provided to said engine during an engine cranking period based on a fuel rail pressure and controlling said EQR during an engine running period based on said fuel rail pressure and an engine runtime period,
    wherein said counter value is set to said predetermined final value after said engine is started for a first time after said engine is assembled.

12. The engine control method of claim 11 further comprising decreasing said EQR as said fuel rail pressure increases during said engine cranking period.

13. The engine control method of claim 11 further comprising decreasing said EQR as said fuel rail pressure increases during said engine running period.

14. The engine control method of claim 11 further comprising decreasing said EQR as said engine runtime period increases.

15. The engine control method of claim 11 further comprising:
    selectively commanding adjustment of said EQR for performance of a catalyst diagnostic; and
    disabling said commanding when said counter value is said one of greater than and less than said predetermined final value.

16. The engine control method of claim 11 further comprising:
    selectively commanding injection of fuel into a cylinder of said engine in two or more separate fuel injections during a combustion cycle to warm a catalyst to a predetermined lightoff temperature; and
    disabling said commanding when said counter value is said one of greater than and less than said predetermined final value.

17. The engine control method of claim 11 further comprising:
    selectively controlling said fuel rail pressure based on a predetermined startup pressure; and
    adjusting said fuel rail pressure to a predetermined purging pressure that is greater than said predetermined startup pressure when said counter value is said one of greater than and less than said predetermined final value.

18. The engine control method of claim 17 further comprising decreasing said fuel rail pressure to said predetermined startup pressure after said fuel rail pressure reaches said predetermined purging pressure.

19. The engine control method of claim 17 further comprising controlling said EQR based on said fuel rail pressure and said engine runtime period during said engine running period until said engine runtime period exceeds a predetermined period.

20. The engine control method of claim 11 further comprising maintaining said spark timing and said airflow while said counter value is said one of greater than and less than said predetermined final value.

* * * * *